United States Patent
Lyons et al.

(10) Patent No.: US 7,150,359 B1
(45) Date of Patent: Dec. 19, 2006

(54) MOTORCYCLE WHEEL STAND FOR PARKING AND TRANSPORT

(76) Inventors: Charles Michael Lyons, P.O. Box 1755, Stillwater, OK (US) 74076; Rodney Dean Brakhage, 22 Windsor Cir., Stillwater, OK (US) 74074

( * ) Notice: Subject to any disclaimer, the term of this patent is extended or adjusted under 35 U.S.C. 154(b) by 189 days.

(21) Appl. No.: 10/785,540

(22) Filed: Feb. 24, 2004

(51) Int. Cl.
*A47F 7/00* (2006.01)

(52) U.S. Cl. .......................................... 211/20; 211/22

(58) Field of Classification Search ................ 211/20, 211/5, 17, 22, 24; 224/924; 482/61
See application file for complete search history.

(56) References Cited

U.S. PATENT DOCUMENTS

| | | | |
|---|---|---|---|
| 445,710 A | | 2/1891 | Bowen |
| 458,974 A | | 8/1891 | Merrill |
| 562,669 A | * | 6/1896 | Smart ........................... 211/20 |
| 565,058 A | * | 8/1896 | Westphal ...................... 70/234 |
| 576,351 A | * | 2/1897 | Penfield ........................ 211/20 |
| 618,507 A | * | 1/1899 | Henderson et al. ............. 211/5 |
| 621,072 A | * | 3/1899 | Gregory ......................... 211/5 |
| 623,807 A | * | 4/1899 | Myers .......................... 211/20 |
| 661,677 A | * | 11/1900 | Taylor .......................... 211/22 |
| 703,280 A | * | 6/1902 | Knoche ........................ 211/20 |
| 2,972,478 A | * | 2/1961 | Raines ......................... 482/61 |
| 3,116,836 A | * | 1/1964 | McCauley .................... 211/21 |
| 3,785,517 A | | 1/1974 | Brajkovich |
| 3,822,898 A | * | 7/1974 | Brownlie ..................... 280/402 |
| 3,861,533 A | | 1/1975 | Radek |
| 4,437,597 A | * | 3/1984 | Doyle .......................... 244/533 |
| 4,702,401 A | * | 10/1987 | Graber et al. ................ 224/536 |
| 4,830,167 A | * | 5/1989 | Lassche ...................... 194/247 |
| 5,301,817 A | * | 4/1994 | Merritt .......................... 211/5 |
| 5,522,781 A | * | 6/1996 | Minoura ..................... 482/61 |
| 5,692,659 A | * | 12/1997 | Reeves ........................ 224/536 |
| 5,735,410 A | * | 4/1998 | Kallstrom .................... 211/20 |
| 5,833,074 A | * | 11/1998 | Phillips ........................ 211/21 |
| 5,941,397 A | * | 8/1999 | Buchanan et al. ............ 211/19 |
| 5,988,402 A | | 11/1999 | Mayfield |
| 6,053,336 A | * | 4/2000 | Reeves ........................ 211/20 |
| 6,062,396 A | * | 5/2000 | Eason ......................... 211/20 |
| 6,241,104 B1 | * | 6/2001 | Kraus .......................... 211/20 |
| 6,460,743 B1 | * | 10/2002 | Edgerly et al. .............. 224/324 |
| 6,488,157 B1 | * | 12/2002 | Chen .......................... 211/20 |
| 6,575,310 B1 | * | 6/2003 | Chamoun .................... 211/22 |
| 6,620,081 B1 | * | 9/2003 | Phillips ........................ 482/57 |
| 6,640,979 B1 | | 11/2003 | Mayfield |
| 6,755,309 B1 | * | 6/2004 | Runge ......................... 211/20 |
| 6,866,282 B1 | * | 3/2005 | Heerspink ................... 280/296 |
| 6,968,986 B1 | * | 11/2005 | Lloyd et al. ................. 224/507 |

* cited by examiner

FOREIGN PATENT DOCUMENTS

WO     WO9638336     12/1996

*Primary Examiner*—Sarah Purol
*Assistant Examiner*—James C. Dooley
(74) *Attorney, Agent, or Firm*—Martin S. High, P.C.

(57) ABSTRACT

An improved motorcycle wheel stand having a set of guide rails (12), a set of vertical supports (14), a positive stop (18), and a perpendicular stabilizing tube (16). The wheel is clamped by pressure supplied by an air spring (38) acting upon a pivoting lever (24) attached to a rotating shoe assembly (21) which rotates up and forward against the rear of the wheel, thus pushing the motorcycle into the stand. Removal of the motorcycle is accomplished by the pressing and cocking of assembly (21) by foot and rolling the motorcycle backwards. Assembly (21) is held down by virtue of the center line of spring (38) being out of line relative to spring mounting points (36) and (34) and the pivot point of lever (24).

10 Claims, 2 Drawing Sheets

MOTORCYCLE WHEEL STAND FOR PARKING AND TRANSPORT

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

The present invention relates to motorcycle stands, specifically to stands used to secure the front wheel of motorcycles for parking or transport.

2. Discussion of Prior Art

It is often desirable to park a motorcycle in a vertical position as opposed to leaning it over on its side stand. A few of the reasons for parking a motorcycle in a vertical position follow:

1) For safely transporting the motorcycle in a truck or on a trailer

2) For conserving space as in a garage or on a showroom floor

3) For parking racing motorcycles or track bikes where stands mounted to the machines are prohibited 4) For working on the motorcycle or for cleaning where the left side would be hard to access on a side stand Years ago most motorcycles came equipped with center stands as well as side stands. While the center stand has not completely disappeared on the modern motorcycle, it is getting much less common. Even when the center stand is included on a motorcycle, it is not adequate support for transporting the motorcycle.

Most modern motorcycles come with full fairings that cover up traditional places to attach tie-down straps. Also, the handle bars of most modern bikes do not protrude beyond the fairing to provide a connecting point for straps. The strapping down of the motorcycle's front end requires compressing the suspension components, which is not recommended for most modern motorcycles. These factors make transporting modern motorcycles in traditional ways both impractical and inappropriate.

Placing the motorcycle on its center stand doesn't help conserve space because the rider must first apply the side stand, leave room to dismount, and then pull the bike up on its center stand. Now the bike is in its same original track as when dismounted and just further back by virtue of the camming action common to center stand design. To make the center stand even less useful is the weight of many new models of motorcycles. Currently there are motorcycles with horizontally opposed six-cylinder motors in excess of 1800 cc and huge two-cylinder motors in excess of 2000 cc. Weights for these large machines are in excess of 400 kg.

One other reason for some means of holding a motorcycle in a vertical position is for the racing or track bike. These machines are prohibited from having either a side stand or center stand of any type.

What is needed is a front wheel stand suitable for holding a motorcycle where front tie-downs are not practical with enough support and stability to park or transport the motorcycle.

Historically, bicycle and motorcycle stands have been designed to use the bike's weight to help hold the bike into the stand or up against a vertical support. For example, the bicycle stand in U.S. Pat. No. 458,974 To Merrell 1891 Sep. 1 uses the teeter-totter design as a cam, thus using the weight-overcenter principle to help hold the bicycle into the stand. This same teeter-totter principle is still being used in various forms to essentially deliver the same results for motorcycles. For example, the motorcycle parking stand in U.S. Pat. No. 6,640,979 B1 To Mayfield 2003 Nov. 4 again uses the same weight-overcenter principle to use the bike's weight to help secure the front wheel against a vertical support. This weight-overcenter design works to hold the bike into the stand to some extent.

However, there are three major problems shared more or less by all the various stands using the weight-overcenter principle. The problems include the following:

1) It is hard to push heavy modern touring-type motorcycles into these stands because these motorcycles must be pushed up and over the elevated pivot point.

2) For the same reasons and especially for riders with shorter legs, it is hard to pull the same heavy motorcycles out of these stands.

One typical example of the type of teeter-totter stand under discussion is the stand of International Patent WO9638336 To Childs and Fry 1996 Dec. 5. This stand uses the very same principle to load the motorcycle but uses a hand lever attached to the teeter-totter to assist in removing the bike. This feature requires two people to operate, however. As the motorcycle cannot be safely balanced and controlled by one person while lifting the lever from the front side of the wheel in order to back the bike up and over the elevated pivot.

3) These stands are difficult for a rider to see when sitting on a motorcycle with a full fairing. Therefore, hitting the entry shoe with the front wheel becomes a difficult task. Pushing a bike from the side is very hazardous because a modern touring motorcycle can weigh well in excess of 400 kg. A lean of just a few degrees off center, especially when the motorcycle leans away from the operator, will result in a very expensive incident.

Ojbects and Advantages

Accordingly, objects and advantages of my invention are:

(a) To provide a motorcycle wheel stand that has a simpler and more reliable way to load a motorcycle into. The motorcycle wheel stand does not rely on the old teeter-totter wheel-chock method that requires the motorcycle to be pushed up and over an elevated pivot point.

(b) To provide a motorcycle wheel stand that has a way to guide the wheel into the stand during the loading process. This assists the rider greatly because the visibility of the front wheel is obscured by the fairing.

(c) To provide a motorcycle wheel stand that is easily used by only one person to load any motorcycle into, regardless of the size or weight of the motorcycle.

(d) To provide a motorcycle wheel stand that will reliably hold a motorcycle in a vertical position for parking, storage, and transport.

(e) To provide a motorcycle wheel stand that is easy to remove the motorcycle from. The present invention does not use or rely on a cam, ramp, or teeter-totter that must be overcome by the rider pushing or pulling the motorcycle over it.

Further objects and advantages are to provide a motorcycle wheel stand that will supply the force necessary to pull the bike into the stand by incorporating a new improvement to hold the motorcycle securely. This new improvement now provides the force necessary to hold the motorcycle securely, thus making the present invention independent of, and unrelated to, the weight of the motorcycle. Still further objects and advantages will become apparent from consideration of the ensuing description and drawings.

SUMMARY

In accordance with the present invention, a motorcycle wheel stand comprising a set of guide rails, a vertical support, an adjacent stabilizing member, and the improvement wherein a gas spring is used to supply force to hold the motorcycle wheel.

DRAWINGS—FIGURES

In the drawings, closely related parts share the same numbers but have different alphabetical suffixes.

DRAWINGS-Reference Numerals

| 8 | entry floor | 10 | central floor |
|---|---|---|---|
| 12L | left entry rail | 12R | right entry rail |
| 14L | left vertical support | 14R | right vertical support |
| 16 | perpendicular stabilizing tube | 18 | stop plate |
| 20L | left brace | 20R | right brace |
| 21 | shoe carriage assembly | 22L | left pivot standoff |
| 22R | right pivot standoff | 23L | left pivot |
| 23R | right pivot | 24 | left shoe carriage lever |
| 26R | right shoe carriage lever | 28L | left cocking piece |
| 28R | right cocking piece | 30 | wheel support shoe |
| 32L | left entry wing | 32 | right entry wing |
| 34 | moveable end of air spring | 36 | mounting block for fixed end of air spring |
| 38 | air spring | 40L | left gusset |
| 40R | right gusset | 42L | left mounting hole |
| 42R | right mounting hole | 44 | trip pedal |
| 45 | trip lever | 46 | trip lever return spring |
| 48 | trip lever stop | 49 | hole for spring |
| 50L | left mounting pin | 50R | right mounting pin |
| 51 | pivot bolt | 52L | left trailer mounting hole |
| 52R | right trailer mounting hole | 54 | mounting bar |
| 56L | left click pin | 56R | right click pin |
| 58L | left transport strap attaching hole | 58R | right transport strap attaching hole |

DETAILED DESCRIPTION FIG. 1 AND FIG. 2—PREFERRED EMBODIMENT

Figure 1:
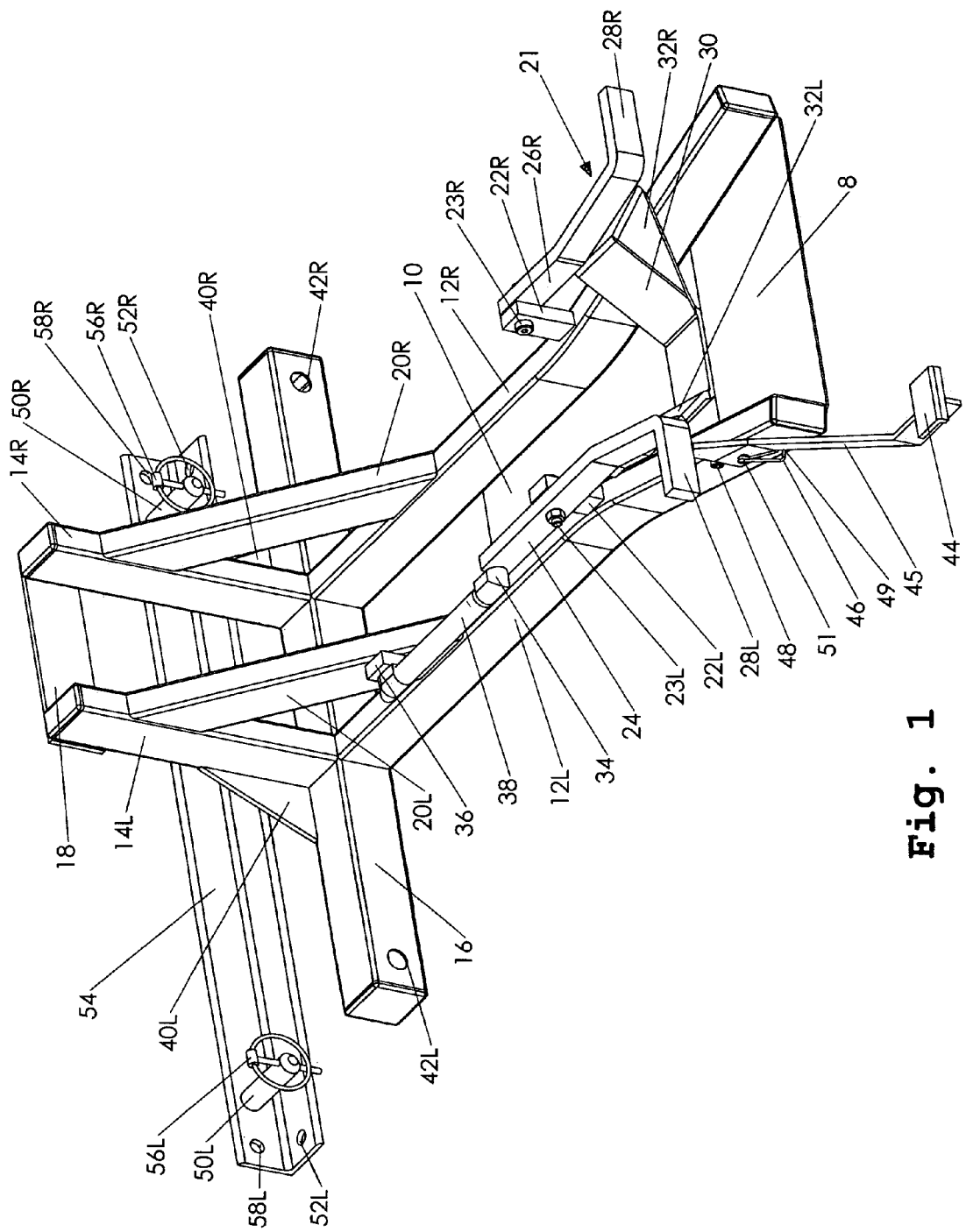
FIG. 1 is a perspective view of the motorcycle wheel stand in the open position ready to accept a wheel, with mounting parts shown separated. All parts are shown in this view.
Figure 2:
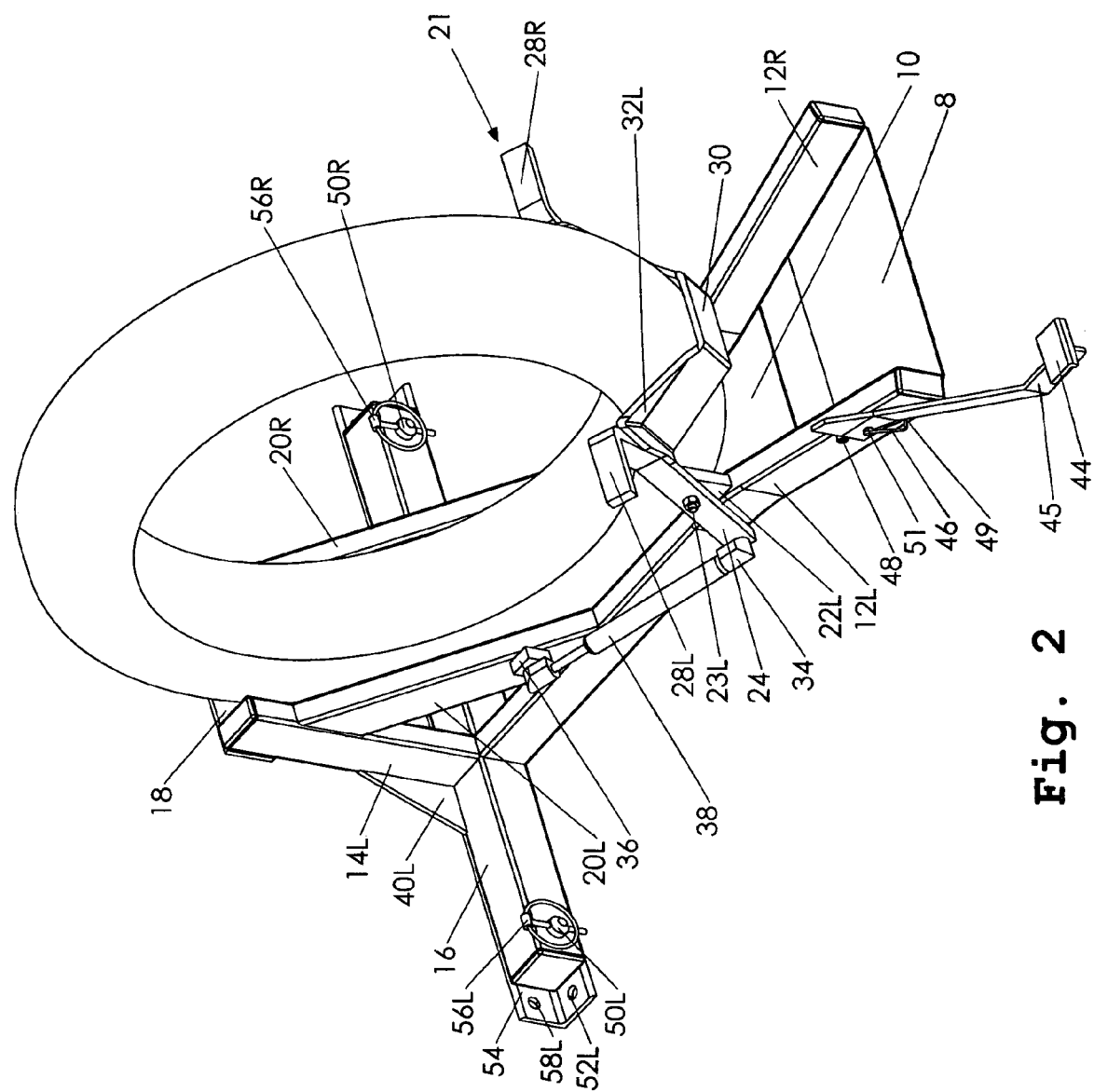
FIG. 2 is a perspective view of the motorcycle wheel stand in the closed position with a tire being held, with mounting parts shown connected. Some parts are hidden by tire in FIG. 2 but are all clearly shown in FIG. 1.

A preferred embodiment of the present invention is illustrated in FIG. 1 (open position) and FIG. 2 (closed position with wheel shown). Both FIG. 1 and FIG. 2 are shown in perspective view. In addition, FIG. 1 shows a trailer mounting bar 54 detached from a perpendicular stabilizing tube 16 for clarity. FIG. 2 shows bar 54 attached to tube 16.

The motorcycle stand of the present invention is made up of steel parts attached together by welding, unless otherwise stated. The parts illustrated in FIG. 1 consist of a pair of entry rails 12L and 12R, which are flared away from each other at one end. Rails 12 are bent so as to become parallel and then terminate against tube 16. An entry floor 8 and a central floor 10 are attached to the underside of rails 12L-R. A pair of vertical supports 14L and 14R is attached to tube 16. A pair of braces 20L and 20R is attached to supports 14L-R and rails 12L-R for strength. A stop plate 18 is attached to support 14L-R. A pair of gussets 40L and 40R is attached to tube 16 and supports 14L-R for strength.

Mounting bar 54 has a pair of mounting holes 52L and 52R for attaching to a floor or trailer. Bar 54 also has a pair of holes 58L and 58R for attaching a transport strap. A pair of mounting pins 50L-R is used to secure the motorcycle stand to bar 54 by inserting pins 50L-R into a pair of holes 42L-R and locking with a pair of click pins 56L-R. An assembly of parts called a shoe carriage assembly 21 is shown in its open position and comprises the following.

A shoe 30 is attached to a pair of shoe carriage levers 24 and 26. Attached to the entry edge of shoe 30 is a pair of entry wings 32L and 32R. Shoe 30 and wing 32L-R make up a wheel support which closely fits the wheel. Levers 24 and 26 pivot about a pair of pivots 23L and 23R and are secured to rails 12L-R by a pair of pivot standoffs 22L-R using shoulder bolts, washers, and locking nuts common to pivoting joints.

Lever 26 terminates on its end opposite of pivot 23R by bending at a right angle to the centerline of the stand forming a cocking piece 28R. A cocking piece 28L is formed on one end of lever 24 where the other end of the lever provides a moveable point of attachment for an air spring 38. Spring 38 is of a predermined pressure and stroke consisting of 578 N pressure and 80 mm stroke and tube length of 132 mm. Spring 38 is available from McMaster-Carr, 6100 Fulton Industrial Blvd., Atlanta, Ga. 30336 as Part No. 9416K724. Spring 38 is attached to lever 24 with a ball stud consisting of a 10 mm ball on one end and a 5/16-18 male thread on the other, also purchased from McMaster-Carr as Part No. 9512K73. The fixed end of spring 38 is attached to brace 20L by means of another ball stud screwed into a mounting block 36. Block 36 is welded to brace 20L. A trip lever 45 is attached to rail 12L by a 6 mm pivot bolt 51 screwed into a captive nut in a conventional manner. A trip lever return spring 46 is used to return lever 45 up at one end where a trip pedal 44 is attached and down at the other end against a trip lever stop 48 consisting of a 6 mm bolt head protruding from the side of rail 12L. Spring 46 is a torsional spring with 1½ turns and 50 mm long ends commonly found at hardware stores. One leg of spring 46 is bent and inserted into a hole 49. Plastic end caps are used to cover all open ends of tube 16, vertical supports, 14L-R, and rails 12L-R. These are commonly found at hardware stores.

The parts illustrated in FIG. 2 are identical to FIG. 1 except for assembly 21 is in the closed position on a wheel. Spring 38 is now in its expanded condition.

Operation—FIG. 1 and FIG. 2

The manner of using the motorcycle wheel stand is to approach the open stand (FIG. 1) while either seated on or pushing a motorcycle from the side. The wheel first makes contact with entry floor 8 where the motorcycle weight bears on the stand and holds it from moving during the loading process. Entry rails 12L-R direct the wheel toward the center of the stand and toward shoe 30. Entry wings 32L-R help direct the wheel through shoe 30. The wheel is now bearing on central floor 10. The wheel is pushed forward to rest up against stop plate 18 and rests between supports 14L-R. Braces 20L-R also help support the wheel to where rails 12L-R are joined by braces 20L-R. Braces 20L-R and rails 12L-R form a close fit to the wheel, lending support. The dimension between rails 12 will vary for the different wheel widths encountered on motorcycles.

Shoe carriage assembly 21 is held in the down position by the alignment of spring 38's moveable end 34 being 3 mm above the center line created by spring 38's fixed end 36 and pivot 23L. Spring 38 is now pushing the forward end of lever 24 up while the opposite end is pushed down by virtue of pivot 23L. The wheel, now rolled past shoe assembly 21 and resting against stop plate 18, is locked in this forward position by pressing pedal 44 by the rider. Pedal 44 is connected to lever 45 and caused to rotate up against cocking piece 28L. This therefore upsets the relationship of the aforementioned alignment causing spring 38 to expand. Spring 38 pushes lever 24 down causing rotation about pivots 23L-R, thus pressing carriage 21 against rear of wheel.

FIG. 2 Because of the placement of pivot 23L relative to spring end 34 and shoe 30, a 2:1 mechanical advantage is applied by spring 38 against the wheel. By virtue of this multiplied force, lever 45 can be activated as soon as the wheel is past shoe 30. This causes carriage assembly 21 to load the wheel fully against stop plate 18 by itself without any pushing effort applied by the rider. In practice, this is the most useful way to operate this present invention. The motorcycle is removed by pushing down on the now elevated cocking pieces 28L-R by the rider's foot from either side of the motorcycle, thus causing lever 24 to rotate about pivots 23L-R causing spring 38 to compress and hold assembly 21 down as in the beginning.

FIG. 2 shows mounting bar 54 attached to the motorcycle stand by inserting pins 50L-R through holes 42L-R and secured with click pins 56L-R. This figure also shows a wheel clamped by the stand.

CONCLUSION, RAMIFICATIONS AND SCOPE OF INVENTION

From the description above, a number of advantages of this motorcycle wheel stand become evident.

1. There is no great effort required to push the motorcycle into the stand as the teeter-totters, cams, or ramps of past devices are replaced with a modern means to accomplish the same end.

2. By utilizing a multiplied mechanical advantage, this stand will load the motorcycle automatically once the shoe is cleared by the wheel.

3. The wheel, more specifically the tire at its widest part, is closely supported from the 9:00 position at the front to the 4:00 position at the rear by various parts of this stand.

4. This stand has a very easy means of attaching to a bar for transport and can just as easily be removed from the bar and used as a storage or parking stand. This gives the stand a plurality of uses.

5. Holes are provided in the transport bar for attaching a strap to go from one end of the bar to the other while passing over the support rails and through the wheel. This renders the wheel immoveable in both the horizontal and the vertical direction of movement.

While the above description contains many specificities, these should not be construed as limitations on the scope of the invention, but rather as an exemplification of one preferred embodiment thereof. Many other variations are possible.

For example:

a) A plurality of air springs can be used.

b) An air spring or springs can be used from the rear of the shoe assembly, thus pushing the rotating carriage up and forward against the wheel with or without multiplication of leverage.

c) The force applied to the rotating shoe carriage assembly can be supplied by some means other than a spring. For example, a hydraulic or pneumatic cylinder using the motorcycle's electrical system to energize the pump required to drive the cylinders.

d) A hand pump or foot-operated pump can be used to drive the hydraulic or pneumatic cylinder.

e) A 12V electric motor driven by the motorcycle's electrical system can be used to energize a worm gear drive, a ball screw drive, or a scissor drive, which is common to power-window devices or power-assisted seats used in automobiles.

f) By causing the main vertical supports to rotate forward by the wheel when loading, a great deal of mechanical leverage is generated by inertia at the lower part of the supports. By attaching a strut, bar, or rod to the lower part of the supports at one end and the other end to the rotating shoe assembly, the spring can be eliminated using the inertia of the motorcycle to lock it into the stand. Associated, additional locks can be supplied to the moveable front support or to the rotating shoe assembly or both for extra security when transporting.

g) The stand can be made larger or smaller in order to more closely fit a particular wheel size.

h) The stand can be constructed of a different material, such as aluminum, reinforced plastic, or other materials not yet invented, as long as adequate strength is retained.

i) The stand can have a different shape as long as its function and usefulness remain.

j) The stand can be painted by air, brush, or dipped in any color available to match a motorcycle.

k) The stand can be powder-coated and baked for a durable finish in any color available.

l) For the ultimate in durability and nonskid characteristics, a urethane-based material, such as that used in truck bed liners, can be applied in any color available.

m) An automatic means of tripping the rotating shoe assembly can be made by using the wheel itself to contact a lever or other device, thus eliminating the manual trip lever.

n) The stand can have the main elements as well as attached parts or assemblies molded or cast in any material common to such processes as long as adequate strength is retained.

o) A pivoting shoe can be used whereby the floor of the shoe will be in full contact with a tire's apex regardless of diameter of the tire.

p) The guide rails can be made to adjust by an arrangement of adjusting rods or by using the floor pieces mounted in a slidably opposed manner so the stand can fit a plurality of wheel widths.

Accordingly, the scope of the invention should be determined not by the embodiment illustrated, but by the appended claims and their legal equivalents.

We claim:

1. A motorcycle stand comprising:
guides to aid the maneuvering of the motorcycle into the stand,
   a vertical arm to positively stop the motorcycle from rolling forward,
   a means to stabilize the stand perpendicular to the guides,
   a means for connecting the guides to the vertical arm thereby causing the motorcycle to rest its weight on the stand through the motorcycle wheel,
a shoe pivotably mounted to the stand and closely fitting the profile of a motorcycle wheel for pushing the motorcycle wheel,
a means of leverage attached to the shoe thereby multiplying a restraining force applied to the opposite end of the leverage to push and hold the motorcycle wheel securely without using the weight of the motorcycle,
a means to press against the leverage thereby rotating the shoe and exerting the restraining force against the motorcycle wheel,
a device to release the leverage and restraining force once the motorcycle wheel passes over the shoe, and
a means to overcome the leverage and restraining force and reset the shoe.

2. The motorcycle stand of claim 1 wherein the leverage is a means for pressing with a greater predetermined force disposed directly to the shoe.

3. The motorcycle stand of claim 2 further comprising a plurality of means to exert the force.

4. The motorcycle stand of claim 3 further comprising a means to automatically release the shoe once the motorcycle front wheel is at a predetermined location within the stand.

5. The motorcycle stand of claim 4 further comprising a coating consisting of a urethane-based material common to truck bed linings.

6. A motorcycle stand comprising:
a pair of parallel guide rails,
a floor plate to connect the rails,
a vertical support,
a stop attached to the vertical support,
a support mounted perpendicular to the guide rails for stabilizing a motorcycle wheel,
a pivotably mounted shoe for pushing and holding the motorcycle wheel is attached to the stand,
an air spring fixed between the stand and a lever to multiply the force of the spring against the shoe,
a trip lever mounted pivotably to the rail resting against the shoe at one end and extending rearward toward the operator at its elevated end such that by pressing the elevated end of the trip lever the shoe is caused to rotate,
a cocking piece to reset the shoe to a cocked or ready position,
whereby the wheel is pushed forward into the stand and held securely without using the weight of the motorcycle.

7. The motorcycle stand of claim 6 wherein the lever is replaced by one or more springs whereby the spring or springs are attached directly to the shoe.

8. The motorcycle stand of claim 7 further comprising one spring.

9. The motorcycle stand of claim 8 further comprising an automatic release causing the spring to press against the lever within the rails.

10. The motorcycle stand of claim 9 further comprising a thermal setting epoxy powder coat.

* * * * *